Nov. 30, 1965   H. E. KASTING   3,220,601
THERMOPLASTIC FILM BAG

Filed May 28, 1962   11 Sheets-Sheet 1

INVENTOR.
HOWARD E. KASTING
BY
ATTORNEY

Nov. 30, 1965 H. E. KASTING 3,220,601
THERMOPLASTIC FILM BAG

Filed May 28, 1962 11 Sheets-Sheet 2

INVENTOR.
HOWARD E. KASTING
BY
ATTORNEY

INVENTOR.
HOWARD E. KASTING

Nov. 30, 1965   H. E. KASTING   3,220,601
THERMOPLASTIC FILM BAG
Filed May 28, 1962   11 Sheets-Sheet 4

INVENTOR.
HOWARD E. KASTING
ATTORNEY

Nov. 30, 1965   H. E. KASTING   3,220,601
THERMOPLASTIC FILM BAG
Filed May 28, 1962   11 Sheets-Sheet 5

INVENTOR.
HOWARD E. KASTING
BY
ATTORNEY

Nov. 30, 1965 H. E. KASTING 3,220,601
THERMOPLASTIC FILM BAG
Filed May 28, 1962 11 Sheets-Sheet 6

INVENTOR.
HOWARD E. KASTING
BY
ATTORNEY

Nov. 30, 1965   H. E. KASTING   3,220,601
THERMOPLASTIC FILM BAG

Filed May 28, 1962   11 Sheets-Sheet 7

INVENTOR.
HOWARD E. KASTING
BY

ATTORNEY

Nov. 30, 1965    H. E. KASTING    3,220,601
THERMOPLASTIC FILM BAG

Filed May 28, 1962    11 Sheets-Sheet 8

INVENTOR.
HOWARD E. KASTING
BY

ATTORNEY

Nov. 30, 1965  H. E. KASTING  3,220,601
THERMOPLASTIC FILM BAG
Filed May 28, 1962  11 Sheets-Sheet 10

INVENTOR.
HOWARD E. KASTING
BY
ATTORNEY

Nov. 30, 1965　　　H. E. KASTING　　　3,220,601
THERMOPLASTIC FILM BAG
Filed May 28, 1962　　　11 Sheets—Sheet 11

INVENTOR.
HOWARD E. KASTING
BY
ATTORNEY

United States Patent Office 3,220,601
Patented Nov. 30, 1965

3,220,601
THERMOPLASTIC FILM BAG
Howard E. Kasting, Park Forest, Ill., assignor to Union Carbide Corporation, a corporation of New York
Filed May 28, 1962, Ser. No. 198,099
7 Claims. (Cl. 229—62.5)

This invention relates to the production of bags from heat-sealable thermoplastic film, and more particularly to industrial type, heavy duty bags suitable for shipping bulk quantities of commodities.

Thermoplastic film of proper thickness has adequate impact, tear and tensile strengths for use as a bag forming material in the construction of heavy duty bags useful for packaging and shipping bulk quantities of the order of 50 to 100 pounds of granular commodities such as fertilizers, molding powders, Portland cement, dyes and pigments, and foodstuffs such as sugar, beans, flour and the like. In contradistinction to the older conventional bag-forming materials such as woven fabric or multi-ply paper, a thermoplastic film provides superior protection against vermin, accidental wetting of the packaged commodity, loss or gain in moisture content and minimum loss of finely divided materials as by sifting through seams or closures.

These advantages of thermoplastic film as a material of construction for heavy duty bags have been appreciated by the art in the development of heavy duty pillow-shaped bags. These are generally made by simply heat-sealing together the ends of a length of flattened tubular film with a pinch type heat-seal, also known as a face-to-face seal. Usually a heat-seal is not as strong as the film per se and can be ruptured by forces insufficient to tear or break the film per se. The pinch type heat-seal of a pillow-shaped bag is particularly vulnerable to the wedging-splitting action exerted thereon by the bag contents. The wedging action is accentuated by impacts and vibrations received by the package during shipment and also by the compression loads in stacked piles of the filled bags.

The present invention is broadly concerned with the production of rugged, sift-proof bags from tubular thermoplastic film, said bags having a flat rectangular-shaped bottom end closure formed by sealed overlapping layers of film and made in such manner that stresses transmitted to said lapped seals by the bag's contents are applied in shear, whereby the overlapped areas are substantially as resistant to rupture as the film in the bag walls.

The invention further contemplates providing such bags with a flat rectangular-shaped top-closure having a tubular filling valve formed of thermoplastic film and integral with the top-closure, the closing of said valve being effected by the bag's contents pressing together the valve's opposite walls into a sift-proof contact with each other.

The nature of the invention will become more apparent from the following description, appended claims and accompanying drawings.

In the drawings accompanying and forming a part hereof, FIGURE 1 is an elevation of a flattened bag blank cut from a length of tubular thermoplastic film and slitted at each end to form a plurality of flaps of a configuration such that the flaps can be sealed together in overlapping relationship.

FIGURE 2 is a perspective, exploded view partly broken away, of the bottom closure forming portion of an opened bag blank as aligned preparatory to being drawn over a mandrel having a pair of hinged trapezoid-shaped leaves for supporting the bottom end portion of the bag blank during heat-sealing operations, said mandrel being readily removable from the bag's other end after completion of the heat-sealing operations required to form the bottom end closure.

Figure 1:
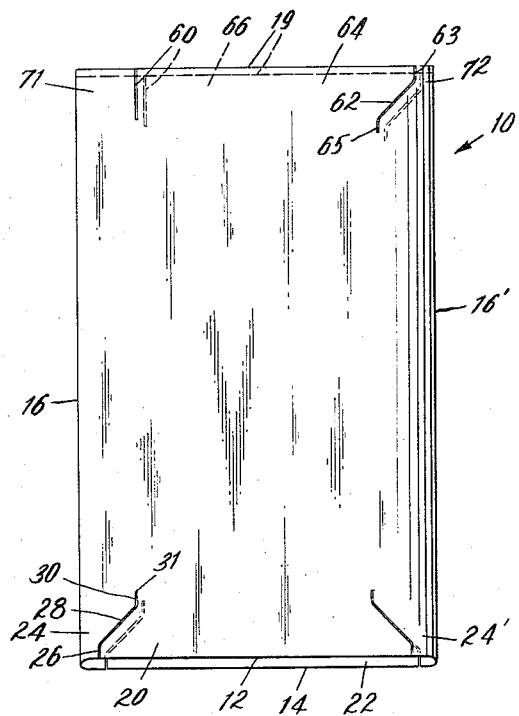
Figure 2:
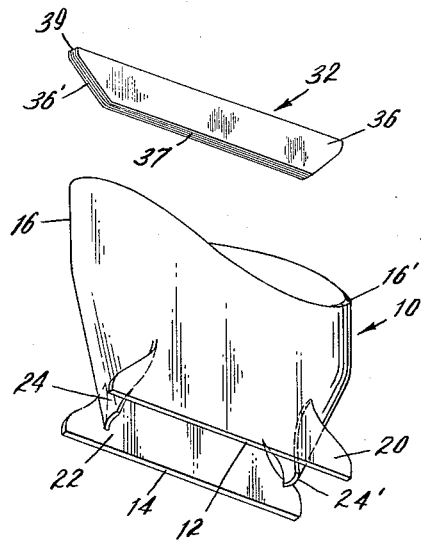

Referring to FIGURE 1, a bag blank 10 having longitudinal flattened edges 16 is square end cut from a length of heat-sealable, flattened tubular thermoplastic film, as for example, the monoolefin polymers such as polyethylene, polypropylene; olefin copolymers such as ethylene-propylene copolymers and ethylene-alkyl acrylate copolymers; and vinyl polymers such as rigid and plasticized polyvinyl chloride, polyvinylidene chloride and the like. The tubular film is preferably seamless tubing such as is formed by the blown tube process as for example by the process described by Fuller in U.S. Patent 2,461,975. The tubular film can also be flat film as formed by slot extrusion or calendering and thereafter sealed together along its longitudinal marginal edges to form tubing. If desired, the tubular film can be biaxially oriented to impart improved physical properties. Both plies of the flattened tubing 10 are die cut at the lower end as shown in FIGURE 1 to form a pair of identical bottom forming closure side flaps 20, 22 and a pair of identical end flaps 24, 24'. The die cuts are so made as to provide opposing side flaps 20, 22 with side edges running diagonally away from the flattened edges 16, 16' whereby the flaps maximum width dimension lies along the square cut edges 12, 14 being substantially co-extensive with the width of the flattened bag blank, as for example, about 95% of said bag blank width and the minimum width dimension lies between the interior die cut termini 31. The inwardly directed sides of side flaps 20, 22 can be a continuous straight diagonal cut extending from square cut edges 12, 14 to interior termini 31, said diagonal being at an angle of about 35° to 55° with respect to flattened edge 16, or a diagonal cut 28 terminating at each end with die cuts 30 running parallel to flattened edge 16. Preferably for ease in manipulation and folding alignment the die cut is made with a diagonal cut portion 28 one end terminating in a cut portion 30 running generally parallel to flattened edge 16 and the other end terminating in a similar parallel cut portion 26.

The film material extending between vertical parallel cut portions 26 in side flaps 20, 22 constitutes a rectangular-shaped tongue portion, these portions being subsequently overlapped and heat-sealed together to form a seal resistant in shear to load stress.

The end flaps 24, 24' as are apparent in FIGURE 1, have diagonally cut side edges complementary to the diagonal edges of side flaps 20, 22 and thus are widest at die cut termini 31, and narrowest at square cut edges 12, 14. Accordingly as more particularly shown in FIGURE 7, each end flap 24, 24' when unfolded along flattened edge 16 approximates a square shape diagonally bisected by flattened edge 16, said shape having an inwardly projecting rectangular-shaped tongue portion 29.

As shown in FIGURES 2 to 6, the bottom portion of die cut blank 10 is spread opened to enable the advance end of an expandable trailing bifurcated flap mandrel 32 to be inserted into the interior of bag blank 10 through an opened end. The mandrel 32 comprises a pair of hinged trapezoid-shaped metal leaves or plates 36, 36'. Preferably the plates are permanently bonded to a flexible sheet 37 of heat-resistant rubber, and particularly silicone rubber which is not only heat-resistant but is also non-adherent at heat-sealing temperatures. The flexible rubber sheet 37 provides a hinged connection 39 for the plates 36, 36'. Each plate 36, 36' has its longest parallel edge running along hinged connection 39; each of such edges has a length approximately equal to the distance between flattened edges 16 of the flattened bag blank 10. The opposite and shorter parallel edge 38, 38' respectively of each plate 36, 36' has a length slightly less than the distance between root cut portions 31 of the bag blank 10. The non-parallel edges of plates 36, 36' each have a length approximately equal to diagonal cut portion 28 of the bag blank 10. As initially inserted and aligned in the bag blank, the plates 36, 36' are collapsed together, but thereafter are each turned through an arc of 90° forming a hexagon-shaped planar work surface for supporting the bag blank during forming and sealing of the bottom closure.

Figure 3:
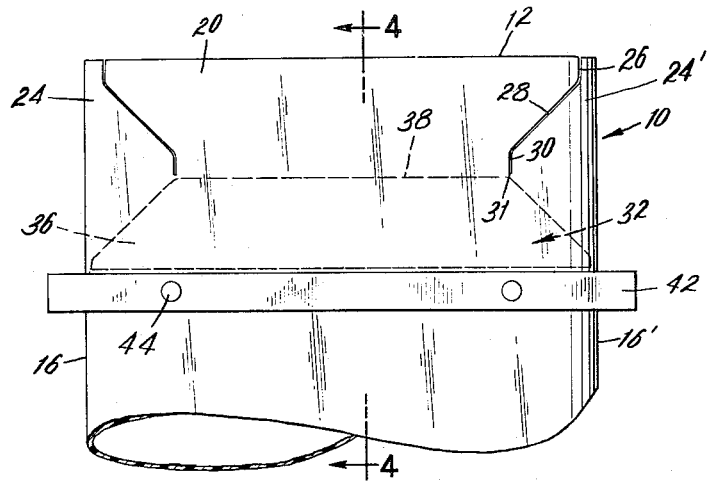
FIGURE 3 is an elevation, partly broken away of the bottom portion of the bag blank having the hinged mandrel interiorly positioned therein for initiation of the flap folding and sealing steps and with the bag blank held between opposing clamp members.
Figure 4:
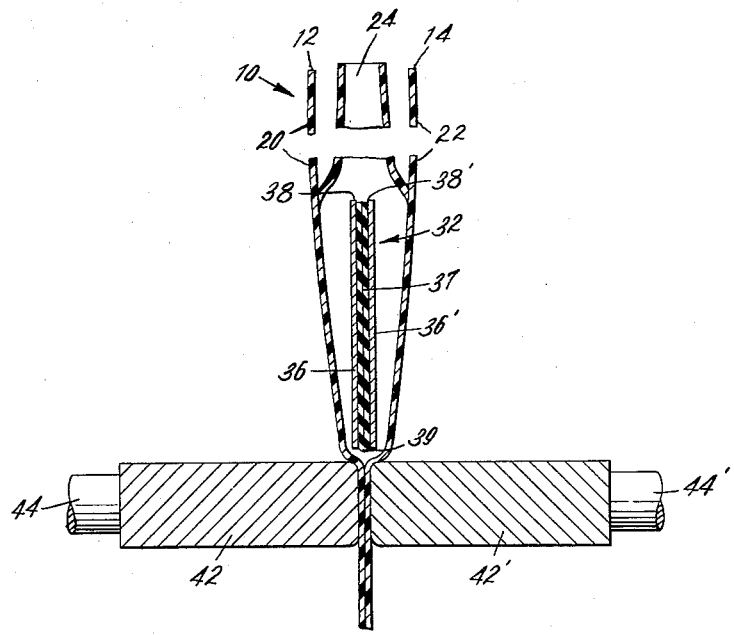
FIGURE 4 is a sectional view, partly broken away and taken along the line 4—4 of FIGURE 3.
Figure 5:
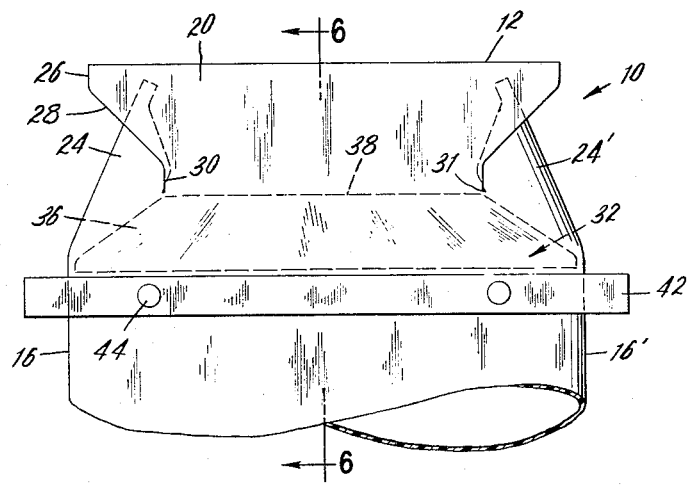
FIGURE 5 is a view similar to FIGURE 3 and showing the trapezoid-shaped leaves of the mandrel partially opened.
Figure 6:
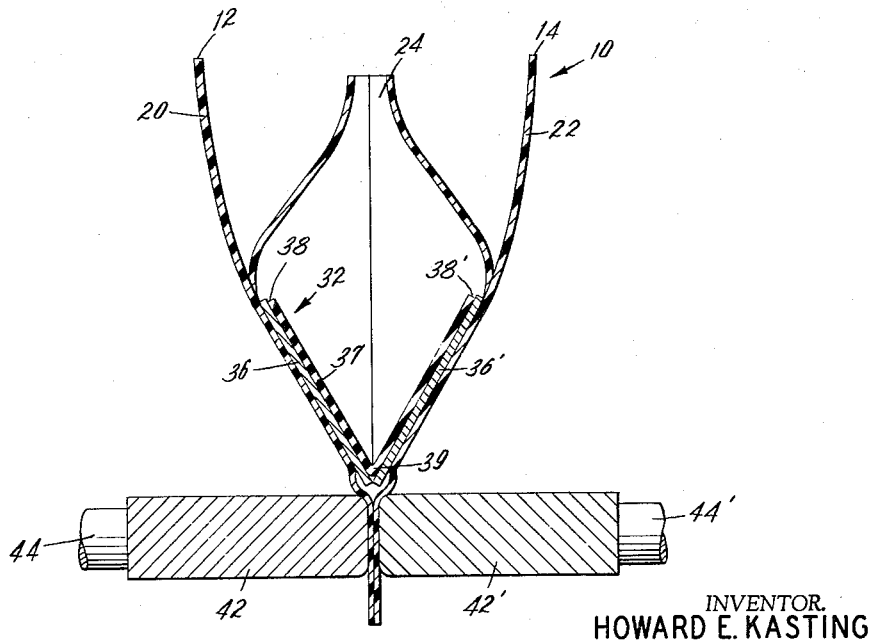
FIGURE 6 is a fragmentary sectional view along the line 6—6 of FIGURE 5.

As particularly shown in FIGURES 3 and 4, the shorter parallel sides 38, 38' of collapsed plates 36, 36' are aligned within the flattened bag blank in a position substantially adjacent to the inner terminus 31 of root portions 30.

The bag blank 10 with interiorly aligned hinged mandrel positioned therein as described supra is then firmly clamped as shown in FIGURES 3 to 7, 9 and 10, against the flat vertical surfaces of opposed bar clamps 42, 42' being brought together by rams 44, 44' actuated by suitable pressure means (not shown) such as hydraulic pistons, springs, cams or solenoids.

Figure 7:
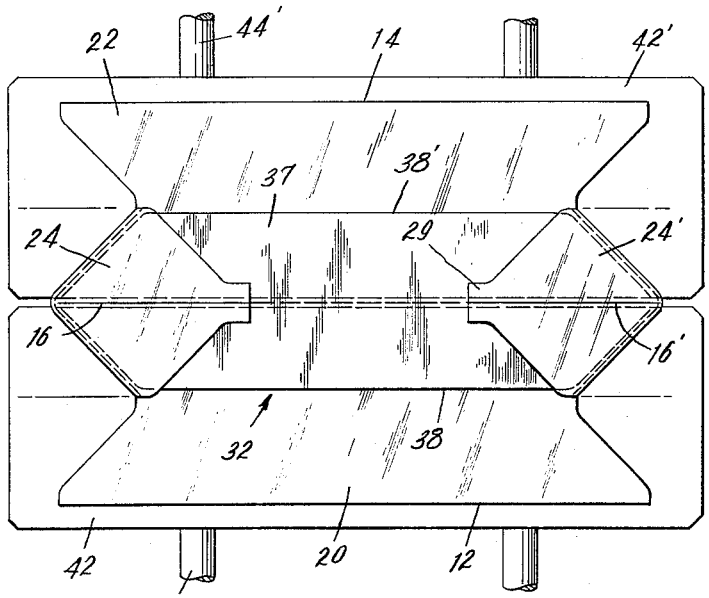
FIGURE 7 is a plan view showing the bottom of the bag blank after its two side flap portions have been outwardly folded over the planar surfaces of the clamping means and its two corner flap portions inwardly folded over the fully opened mandrel leaves.

After bag blank 10 has been clamped between clamps 42, 42' the template leaves 36, 36' are opened to a position parallel to the horizontal surfaces of clamps 42, 42' as shown in FIGURES 5 to 7, 9 and 10, causing end flaps 24, 24' to be folded inwardly over the planar rubber surface 37 thereby assuming a rectangular shape diagonally bisected by opened flattened edge 16 as illustrated in FIGURE 7.

Figure 9:
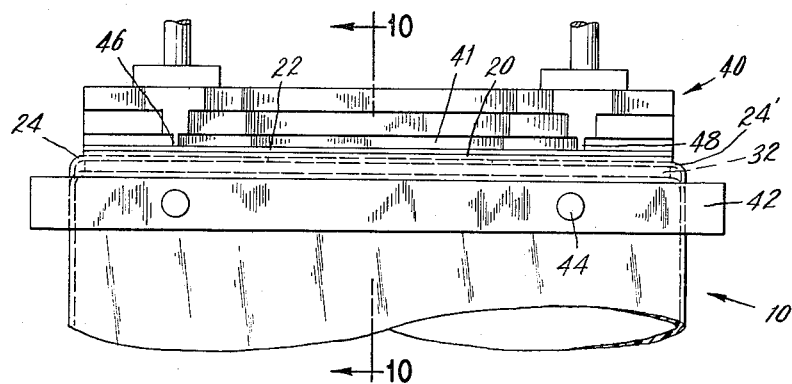
FIGURE 9 is a fragmentary elevational view showing the bottom portion of the bag blank being heat-sealed together by the sealing bar of FIGURE 8 applying heat and pressure thereto.
Figure 10:
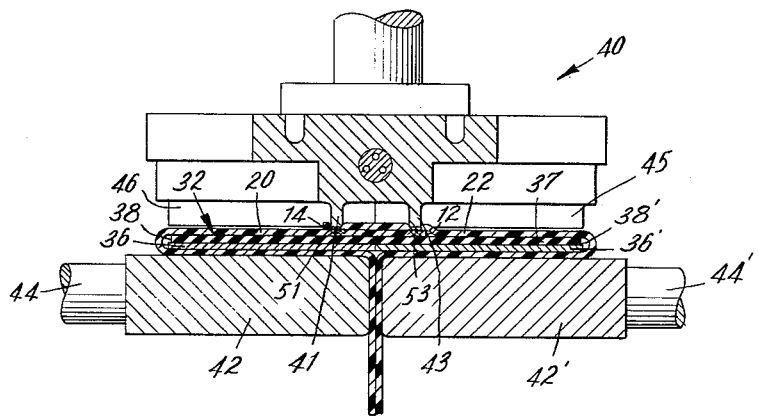
FIGURE 10 is a sectional view along the line 10—10 of FIGURE 9.

Opposed side flaps 20, 22 as shown in FIGURES 9 and 10 are then inwardly folded over edges 38, 38' respectively of template leaves 36, 36' in overlapping relationship to each other and with respect to flattened end flaps 24, 24'.

Figure 8:
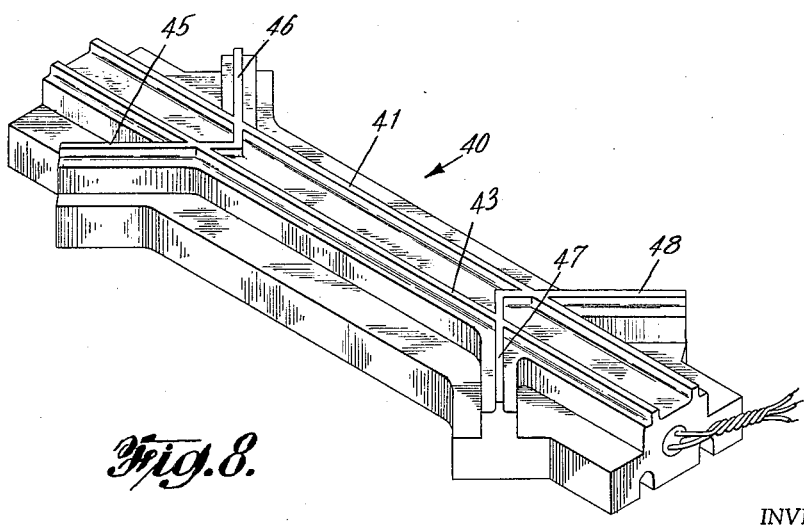
FIGURE 8 is a perspective view of an electrically heated sealing bar assembly for sealing together the bag blank's bottom flaps to form a sift-proof bottom closure.
Figure 12:
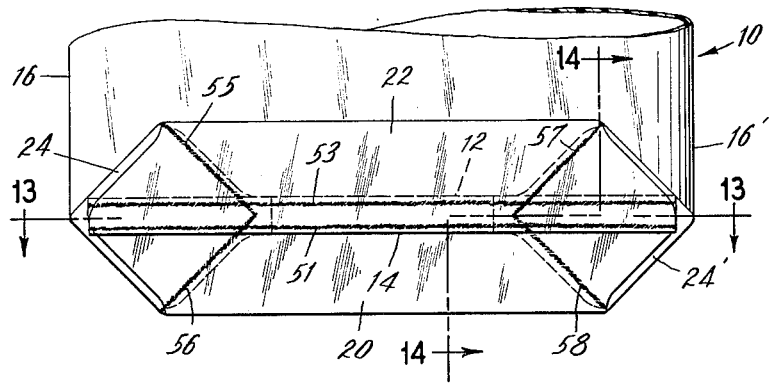
FIGURE 12 is a partial elevation of a flattened bag having a hexagon-shaped bottom closure resulting from heat-sealing together the end flaps and overlapping side flaps.

Referring to FIGURES 9 and 10 the heat-sealing together of the end flaps and side flaps to form a sift-proof bottom closure is accomplished by advancing an electrically heated heat-sealer bar assembly 40 as shown in FIGURE 8 against the planar surfaces bifurcated mandrel 32 and horizontal surfaces of clamping members 42, 42' while being heated to a sealing temperature by the several heat-sealer bars mounted in assembly 40. Parallel heat-sealer bars 41, 43 form the full length parallel heat-seals 51 and 53 in the bag's bottom closure as shown in FIGURES 10 and 12. Other heat-sealer bars 45, 46, 47 and 48 concurrently form respectively the four diagonal heat-seals 55, 56, 57 and 58 of the bottom closure. A heat-seal width of 1/8 inch or more is usually adequate to obtain a strong bond between the film plies.

The use of a hinged mandrel 32 as illustrated in the drawing is an important and necessary feature in the process of forming the bag's bottom closure. The hinged mandrel 32 facilitates the proper opening and planar positioning of the opposed side flaps 20, 22 and end flaps 24, 24' for the heat-sealing operation; it provides a substantially rigid planar surface to interiorly support infolded end flaps 24, 24' while they are being overlapped heat-sealed to the inner surfaces of overlapped side flaps 20, 22 while concurrently interiorly supporting overlapped side flaps 20, 22 as they are heat-sealed together by heat-seals 41, 43, 45, 46, 47, 48; and of particular importance, hinged mandrel 32 effectively prevents unwanted heat-sealing together of overlapping film layers in areas other than those desired. Additionally, inasmuch as after the bottom heat-seals have been formed, the tapered ends of mandrel 32 are each partially pocketed within end closures 24, 24', the mandrel unless hinged as shown, could not be readily withdrawn from the bag's interior through its open top end.

Figure 11:
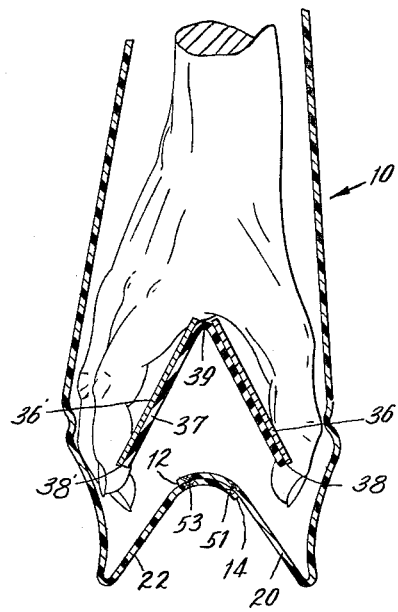
FIGURE 11 is a view illustrating the manual removal of the hinged mandrel from the bag blank after completion of the heat-sealing of the flaps forming the bottom closure.

Upon completion of the seals forming the bottom closure of the resultant bag, the clamping bars 42, 42' are opened in order to remove the bag. The mandrel 32 is removed as shown in FIGURE 11 from the bag interior by folding it to an included angle of 20° to 90° such folding enabling it to be removed without injury to the bag walls.

Figure 13:
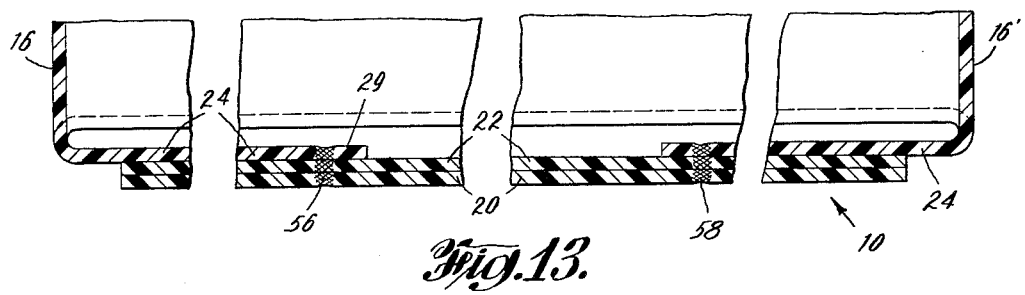
FIGURE 13 is a sectional view, partly broken, taken along the line 13—13 of FIGURE 12.
Figure 14:
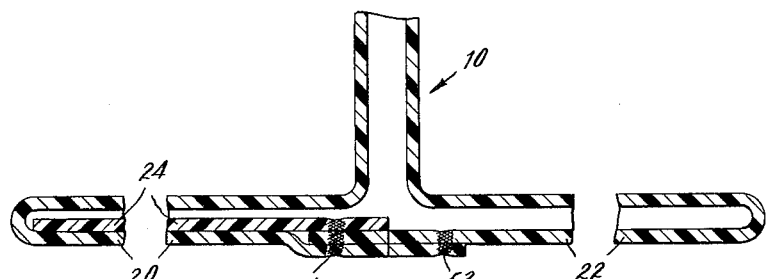
FIGURE 14 is a sectional view, partly broken, taken along the line 14—14 of FIGURE 12.

As more particularly shown in FIGURES 12 to 14, the heat-seals fuse together all overlapping film plies forming an adequately strong, substantially sift-proof closure.

Figure 15:
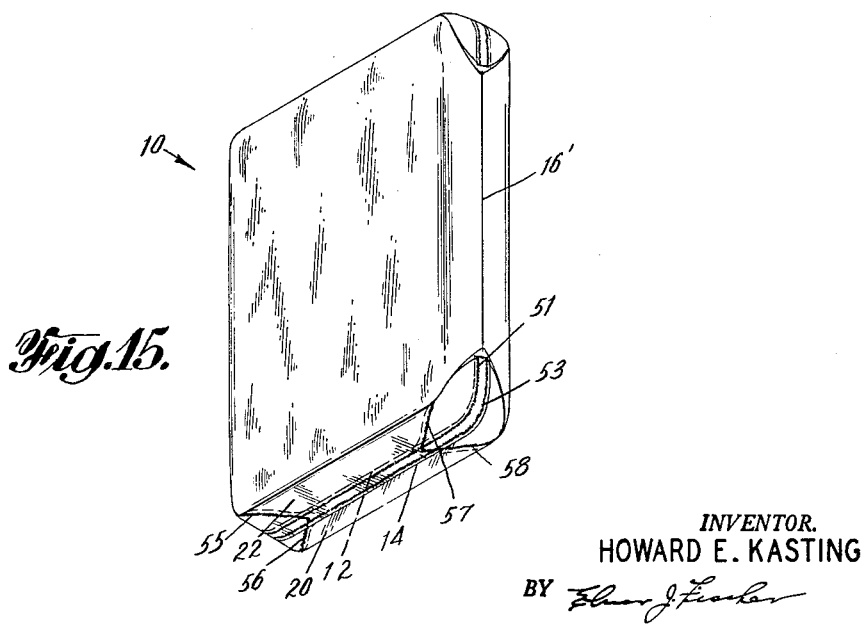
FIGURE 15 is a perspective view of a filled thermoplastic film bag having a bottom closure as illustrated in FIGURES 12 to 14.

As shown in FIGURE 15, the resultant bottom closure assumes a substantially flat rectangular-shape upon the bag being filled with a pourable commodity.

The top closure for said bag can be made in various ways including heat-sealing together the opposing walls, stapling or clamping with metal fasteners, sewing, tying with twine, or knotting the gathered end. Preferably, however, the bag is made with a rectangular top closure similar to the bottom closure, said closure being provided with a filling valve for readily filling the bag with a pourable commodity, said valve being closable by pressure exerted thereon by the filled bag's contents causing the valve walls to collapse against each other.

Referring to FIGURE 1, such a top closure is formed by die cutting through both walls of the upper end of flattened bag blank 10 vertical slots 60, extending downwardly from the upper square cut edge 19 to substantially the same extent as the die cut diagonal slots 62 on the opposite end of the upper square cut edge. The upper end of diagonal slot 62 terminates in a vertical die cut 63 and the lower end in a vertical die cut 65. Slots 60 are inwardly spaced from left hand folded edge 16 a distance at least equal to the space between slot 65 and its adjacent folded edge 16, and preferably at a slightly larger spacing in order to provide an end flap 71 as shown in FIGURE 16 having a rectangular base portion whose opposite edges 74 and 76 extend beyond fold lines 103—103 and 101—101 respectively.

The film plys extending between die cut slots 60 and its immediately adjacent folded edge 16 generally constitute one end flap 71 of the top closure, and correspondingly the film plies extending generally between diagonal slots 62 and its adjacent folded edge 16 constitute the opposite or right end flap 72 of the top closure. The two film plies extending between vertical slots 60 and diagonal slots 62 constitute the side flaps 64, 66 which subsequently are sealed together in overlapping relationship.

Figure 16:
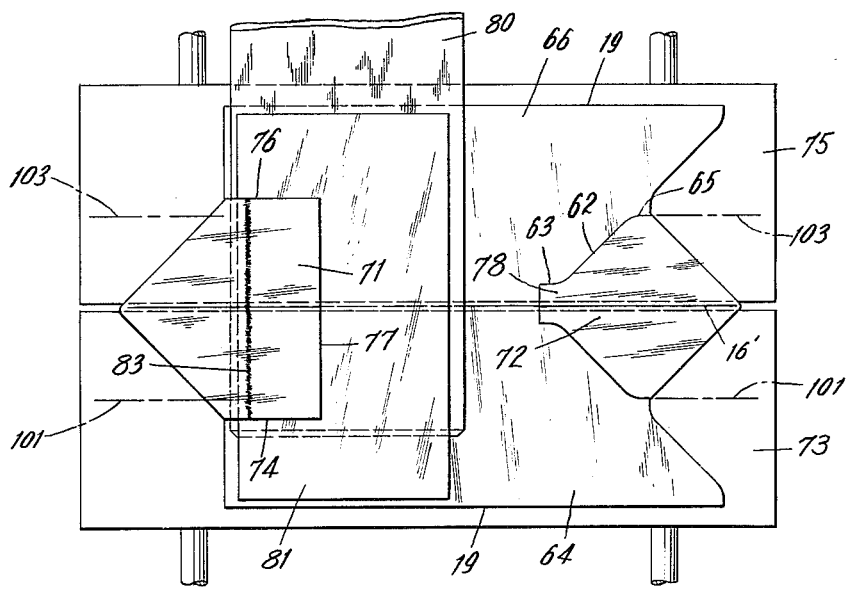
FIGURE 16 is a partial plan view showing the upper portion of the bag blank of FIGURE 1 supported by opposing clamping members and wherein the side flaps have each been outwardly folded, the end flaps inwardly folded, and a filling valve forming sheet of thermoplastic film positioned under one of the end flaps, and heat-sealed thereto.
Figure 17:
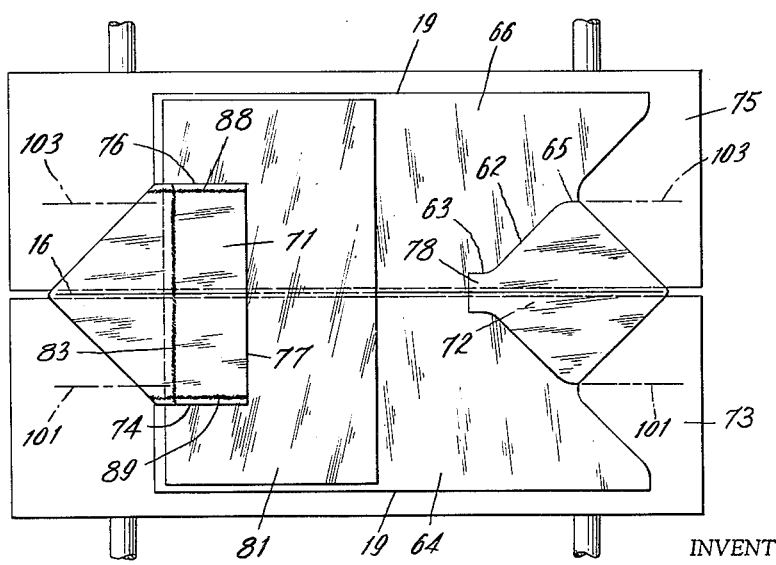
FIGURE 17 is a view similar to FIGURE 16 and shows the heat-sealed attachment of the valve forming sheet to one end flap and both side flaps.

To facilitate spread-opening of the flattened bag blank upper extremity, the upper portion of flattened bag blank 10 is vertically positioned between bar clamps 73, 75 as shown in FIGURES 16 and 17, such that cut edges 19 extend upwardly from the horizontal surfaces of clamps 73, 75, a distance equal to twice the vertical depth of slot 65 from edge 19, minus the vertical depth of slot 63.

The spread-opening is effected by turning back side flaps 64, 66 away from each other and to a plane perpendicular to the vertically held bag blank 10. The back folded side flaps 64, 66 are pulled outwardly along said plane until the die cut end flap portions 71, 72 have been pulled inwardly along the width of the bag blank and flattened to the same plane level as the side flaps 64, 66 thereby forming in the instance of left end flap 71 a two film ply thick pentagon configuration having two equal parallel sides 74, 76 resulting from die cut slots 60 and a base edge 77 perpendicular to said sides and derived from the blank's square cut edge, and in the instance of right end flap 72 a square configuration diagonally bisected by folded edge 16 and having a small inwardly projecting rectangular or tab base portion 78 extending between the parallel edges of die cuts 63. Bar clamps 73, 75 are then closed together to hold the blank securely during the sealing operations hereinafter described.

As shown in FIGURE 16, the filling valve is constructed from a rectangular cut sheet of heat-sealable thermoplastic film 81 which is inserted underneath the inwardly extending rectangular-shaped base portion bounded by edges 74, 76 and 77 of end flap 71 and over the back folded side flaps 64, 66. The planar dimensions of rectangular sheet 81 are such that it extends substantially between the square cut edges 19 of horizontally fully extended side flaps 64, 66 and for a substantial distance along the width of the side flaps 64, 66 of left end flap 71 but not including any overlapping of right end flap 72.

As shown in FIGURE 16, rectangular valve-forming sheet 81 is initially heat-sealed to the inner side of the rectangular tab portion of left end flap 71 by a linear heat-seal 83 spaced parallel to the cut edge 77 of flattened left end flap 71. Such heat-sealing in accomplished by inserting a rubber covered metal platen 80 underneath valve sheet 81 and end flap 71 and over outwardly extending side flaps 64, 66 which are in planar contact with the upper flat horizontal surfaces of bar clamps 73, 75, and pressing a straight bar heat-sealer against the outer surface of the rectangular tab portion 71. Platen 80 is withdrawn and as shown in FIGURE 17, the valve-forming sheet 81 is additionally heat-sealed to left-end flap 71 and also to side flaps 64, 66 by linear heat-seals 88, 89 extending generally along and adjacent to edges 74, 76 of end flap 71. In forming heat-seals 88, 89, a suitable bar heat-sealer is brought into pressure contact with the outer surface of the rectangular end portion 71. Since this heat-sealing step is intended to heat-seal sheet 81 to side flaps 64, 66, platen 80 is not used.

Figure 18:
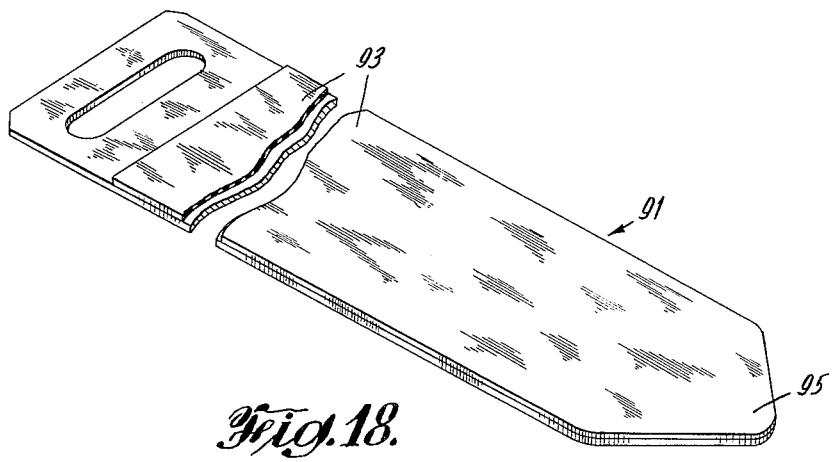
FIGURE 18 is a perspective view of a platen particularly adapted for interiorly supporting the internal surfaces of the valve-forming sheet during its heat-sealing to the side flaps and end flap of the bag blank.

In order to produce a tubular valve from valve sheet 81 and concurrently to seal together side flaps 64, and 66 in overlapping relationship to each other and to right end flap 72, the side flaps are folded inwardly 180° along their respective fold lines 101—101 and 103—103, said fold lines extending from the termini of slot cuts 65 and running across the bag blank width parallel to square cut edge 19. Fold lines 101—101 and 103—103 are both parallel spaced from cut edges 19 a distance equal to the vertical depth of slot 65 from edge 19. The inward folding of the side flaps 64, 66 can desirably be guided by first positioning over the extended side flaps and pocketing underneath end flap 72, a metal platen 91 such as is illustrated in FIGURE 18 preferably one having a flexible heat-resistant rubber surface 93, and particularly a silicone rubber. Platen 91 has a width substantially equal to the space between fold lines 101—101 and 103—103 and a tapered tongue portion 95 approximating the shape and area of flattened infolded right end flap 72.

Figure 19:
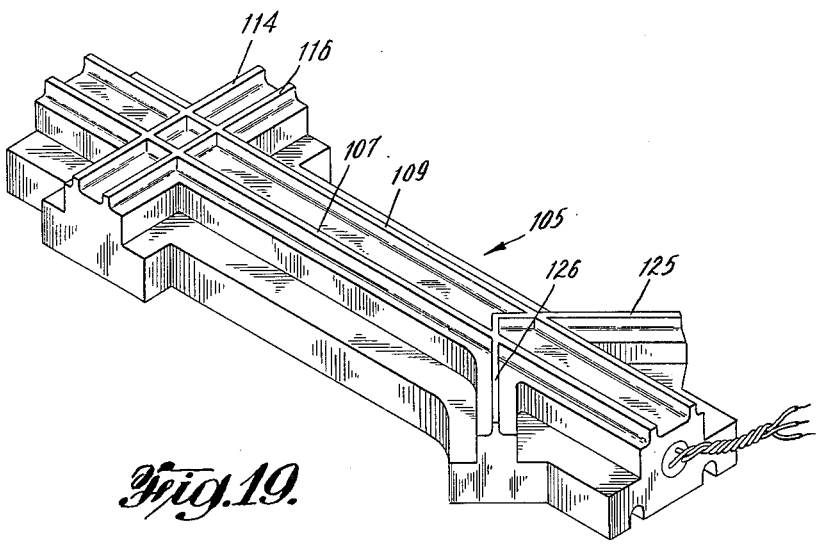
FIGURE 19 is a perspective view of a bar heat-sealer particularly adapted in cooperation with the platen of FIGURE 18 to form the line heat-seals of the bag's top-closure and filling valve.
Figure 20:
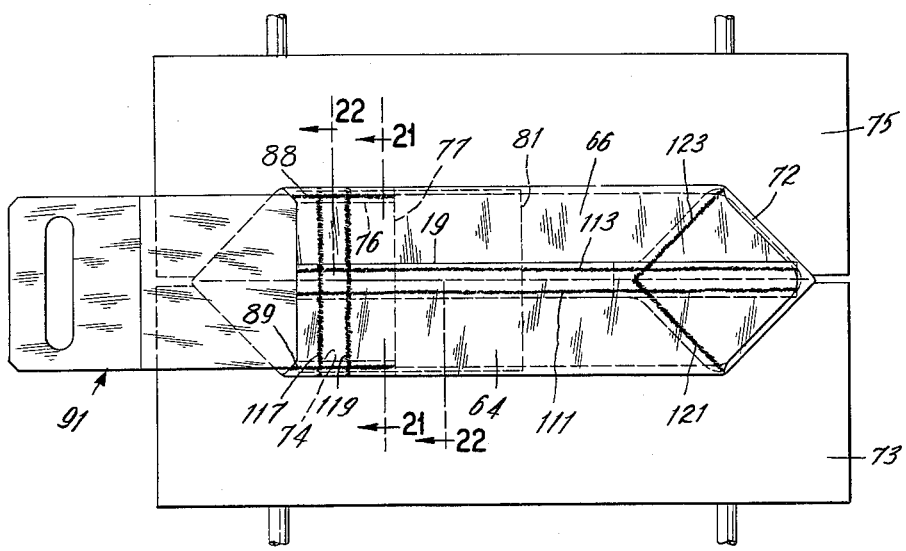
FIGURE 20 is a plan view showing the platen of FIGURE 18 as inserted in the bag's top-closure and filling valve during the heat-sealing thereof.
Figure 21:
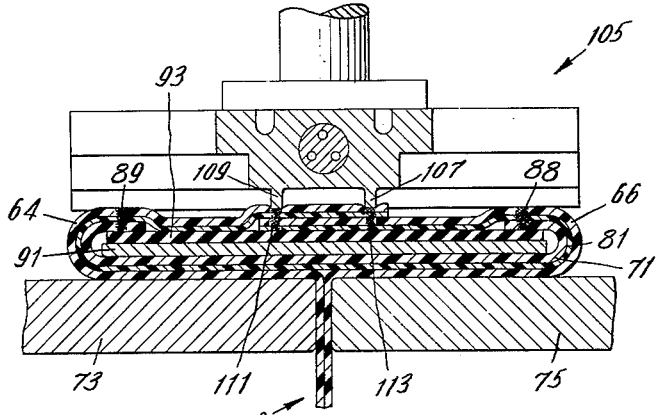
FIGURE 21 is a cross-sectional view of a heat-sealing station and associated platens taken along the line 21—21 of FIGURE 20 and sealing bar for forming the heat-seals of the bag's top-closure.
Figure 22:
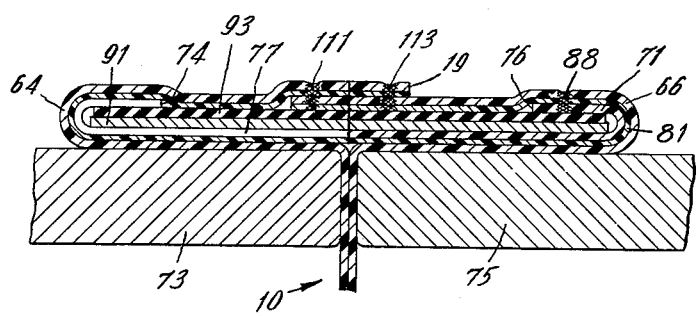
FIGURE 22 is a cross-sectional view taken along the line 22—22 of FIGURE 20.

After the side flaps 64, 66 have been infolded in overlapping relationship and with mandrel 91 inserted thereunder, as shown in FIGURES 20 to 22, the side flaps and end flaps are heat-sealed together by an electrically heated multi-sealing bar assembly 105 as depicted in FIGURE 19. Heat-sealer assembly 105 is provided with parallel raised bar sealing surfaces 107, 109 which as shown in FIGURES 20 to 22 produce the parallel heat-seals 111 and 113 effectively joining together the entire overlapped area of infolded side flaps 64, 66, including the overlapped area extending over end flap 72 whereby the latter is concurrently sealed to side flaps 64, 66.

Parallel heat-sealing bar surfaces 114, 116 on bar assembly 105 produce, as shown in FIGURE 20, parallel heat-seals 117, 119 extending across infolded side flaps 64, 66 between fold lines 101—101 and 103—103 said heat-seals bonding valve sheet 81 to the inner surfaces of the side flaps 64, 66, and additionally bonding together said flaps in their overlapped portions. It is to be noted that heat-seals 117 and 119 extend slightly beyond and overlap previously formed heat-seals 88 and 89 which effected a preliminary bond between the valve sheet 81 and inner surfaces of side flaps 64, 66. This slight extension of heat seals 117 and 119 together with heat-seal 83 between valve sheet 81 and left end flap 71 insures a sift-proof attachment between valve sheet 81, end flap 71 and the overlapped side flaps 64, 66, and effectively prevents end flap 71 and its attached valve in the completed heat-sealed bag from being blown out when the filled bag is dropped or otherwise subjected to violent impacts.

Right end flap 72 is further secured by diagonal heat-seals 121, 123 to the overlapping inner surfaces of side flaps 64, 66, these seals being formed by raised bar sealing surfaces 125, 126 of sealing bar assembly 105. Diagonal seals 121, 123 in conjunction with longitudinal seals 111, 113 effect a sift-proof closure between end flap 72 and overlapping side flaps 64, 66.

Figure 23:
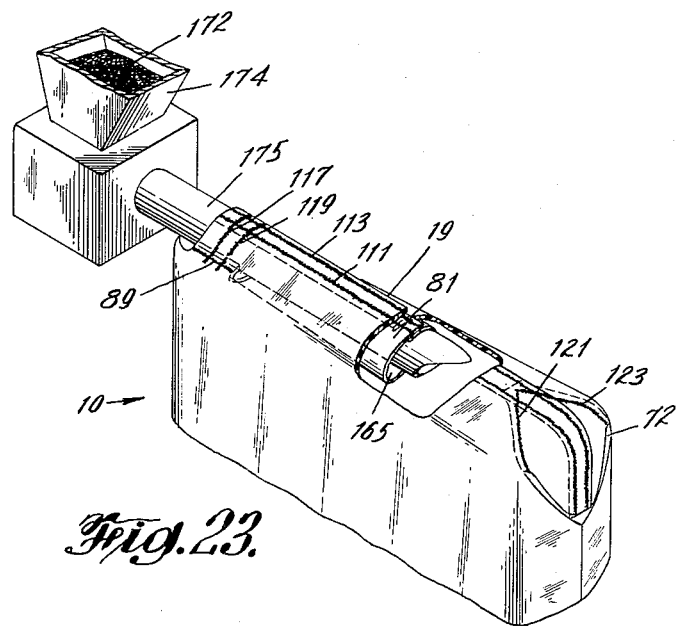
FIGURE 23 is a partial perspective view of the thermoplastic film bag being filled with a particulate commodity by means of a spout inserted through the plastic film filling valve.

As shown in FIGURE 23, the resultant heat-sealed bag is readily filled with a pourable commodity 172 from a hopper 174 having a horizontal tubular extension 175 preferably terminating beyond the bag's filling valves discharge opening 165. After the bag has been filled, it is removed from the extension 175. The filling valve then closes off the bag by being flattened together by the pressure of the bagged commodity thereon. In practical shipping tests, it has been found that little or no sifting of the bag's contents occurs through the thus closed valve.

Satisfactory bags have been made according to this invention having the following dimensions which are given as an example and not by way of limitation. Film forming polyethylene having a density of 0.92 was melt extruded into tubular film 0.010 inch thick by 20.5 inches flat width which was square-cut to a bag blank 30 inches long. Referring to FIGURE 1, the bag blank was die cut so that slot 26 starting at the lower extremity of the bag blank was parallel spaced about 5/8 inch from its immediate adjacent edge fold 16, and a distance of about 5/8 inch upwardly from the bottom square cut edge of the blank. Each diagonal cut slot 28 was made at a 45° angle with respect to its adjacent folded edge 16 and was 3 3/16 inches in length. Vertical slots 31 were each 5/8 inch long. Bottom end flaps 24, 24' upon being infolded as shown in FIGURE 7 each formed a square of about 4 1/16 inches on each side set diagonally into each end of end closure forming flaps 24, 24'. The overlapped longitudinal portions of side flaps 20, 22 were each 19 1/4 inches long.

A heat-sealed sift-proof bottom closure was formed with such a bag blank using a forming mandrel 32 having a pair of trapezoid-shaped leaves each about 20 inches long at their hinged edge by about 2 3/4 inches wide. The fully infolded template leaves 36, 36' of the mandrel 32 formed a hexagon-shape which was 20 inches long over the points, 5 1/2 inches wide and 14 1/4 inches long along the free edges 38, 38'. The bottom closure was formed by inwardly folding about the hexagon-shaped template, the end flaps 24, 24' and side flaps 20, 22. Side flaps 20, 22 were heat-sealed together with an overlap of about 1 1/4 inches width by 20 inches long, thereby effectively joining together the entire bottom closure and supporting it across substantially the entire width of the bag.

The top closure of the bag blank was die cut to place vertical slot cuts 60 at a parallel spacing of 3 3/8 inches from their immediate adjacent flattened edge 16 and terminating downwardly 3 inches from the square cut top edge of the blank. Vertical slot cuts 65 were parallel spaced 2 7/8 inches from their immediate adjacent flattened edge 16' and terminating downwardly 3 1/2 inches from the square cut top edge 19 of the bag blank. Thus, when end flap 71 is folded inwardly as shown in FIGURES 16 and 17, its parallel edges 74, 76 are each 3 inches long and its edge 77 is 6 3/4 inches long. Dimensions and spacing of die cut slots 63, 62 and 65 forming end flap 72 were the same as that used to shape cut bottom end flaps 24, 24'. The valve forming sheet 81 was polyethylene film of 0.0015 inch thickness, 10 inches wide and 13 1/2 inches long.

These bags were filled with 50 pounds of polyethylene molding granules introduced into the bag through the collapsible valve structure 81. The bag was removed from the spout 175 and dropped onto the floor in such manner that its corner-formed bag end closure 72 struck the floor first, causing the contents to press against the bag's top closure. This impact pressure collapsed together against the interior of the top closure, the film walls of the valve structure formed by the heat-sealed tubular film 81 preventing loss by sifting of the contents therethrough during subsequent handling and transportation of the bag. The filled bags were subjected to drop tests and practical shipping tests by being transported for several thousand miles in trucks and railway freight cars, and were found to have a much lower incidence of breakage than conventional multi-ply paper bags and bags made of thermoplastic film heat-sealed together by pinch type seals, also known as face-to-face seals.

Although the size and overall generally rectangular-shape of the above-described filled plastic film bags were comparable to filled conventional multi-wall paper shipping sacks of the same capacity, it will be apparent to those skilled in the art that the bag blank dimensions can be selected to provide bags of practically any desired length and width commensurate with the strength properties of the plastic film and intended use of the bag. If desired, by appropriately extending the length of the diagonal slot cuts 28, 62 and vertical slot 60 in bag blank 10, a bag can be formed therefrom which upon being filled with a pourable commodity assumes a square cross-sectional shape. In such instance, diagonal slot cuts 28 are of such length, that upon infolding and flattening end flaps 24, 21, their tongue portions 29 overlap each other instead of being spaced apart as shown in FIGURE 7. Correspondingly, the die cut slots 60 and 62 for forming the top closure are lengthened whereby tongue portion 78 of right end flap 72 upon being infolded and flattened as shown in FIGURES 16 and 17 is positioned at about the midpoint of the bag's flat width. As is apparent, decreasing the length of die cut slots 28, 60, 72 in bag blank 10, decreases proportionally the thickness of the resultant filled bag as correspondingly the filled bag width approaches the flat width of the bag blank 10. In general to obtain an adequate longitudinal overlap of side flaps 22, 24 for producing shear resistant heat-seals 41, 43, die cut slots 28 should be of such length as to result in a bag having a filled flat width not in excess of about 90% of the flat width of bag blank 10.

The superior resistance to breakage of the thermoplastic film bags of this invention, particularly in the area of their bottom and top closures is the direct result of said closures having been formed by sealing together in overlapping relationship the several flaps constituting the closure whereby the stresses transmitted to the bag walls by its contents are resisted in shear. Further contributing to the bag's resistance to breakage is the double and triple film ply construction of the bag's several corners which are formed by the sealed overlap of the side flaps and each end flap. The reinforcement obtained by this double film ply construction extends for a substantial distance around each corner as can be seen in FIGURES 15 and 23.

It has been found, in the case of heat-sealing relatively thick films, such as the 10 mil polyethylene of the bag described, that a uniform pressure must be maintained during heat sealing, sufficient to ensure intimate contact of the films at the interface and supply the force necessary to fuse the softened thermoplastic. However, sealing pressure must be kept to a minimum to prevent excessive flow of material from the site of the seal, and thus prevent a normally non-peelable seal from failing at stresses substantially below the yield strength of the film.

Typically 10 mil thick polyethylene film (density 0.920) which has a yield strength of about 16 pounds per lineal inch, and an ultimate strength of about 23 pounds per lineal inch was satisfactorily heat-sealed using a pressure of 10 pounds per square inch on the sealing bar having a surface temperature of about 500° F. to 550° F. for a dwell time of about .75 to 1.0 seconds.

Although this invention has been described in particular detail with respect to bags made from plastic film of a single wall thickness, the principles of this invention are applicable to the manufacture of bags from laminated thermoplastic films including such composite films as laminates of polyethylene film and polypropylene film; of polyethylene film and vinylidene chloride polymer or copolymer film; of plasticized vinyl chloride polymer or copolymer film and polyethylene film; of polyethylene film and regenerated cellulose film coated with a heat-sealable coating; of a heat-sealable thermoplastic film such as polyethylene film or plasticized vinyl chloride polymer or copolymer film and a metal foil such as aluminum foil; of a thermoplastic film such as polyethylene and a fibrous web such as paper or woven or unwoven fabrics of organic or inorganic fibers such as cotton fibers, rayon fibers, nylon fibers, linear polyester fibers, polyacrylonitrile fibers, asbestos fibers, and glass fibers.

In the use of such laminated films, it is preferred, that both outer laminate surfaces be a heat-sealable thermoplastic material in order to obtain strong shear-resistant seals in the bag's bottom and top closures.

By a suitable choice of the various materials in a film laminate it is possible to provide desired vapor transmission rates through the bag's walls, resistance to attack by corrosive packaged commodities, heat-resistance, abrasion and scuff resistance, opacity to light particularly in the instance of metal foils, and improved flexure, impact and tensile strengths as for example in the instance of laminates having a reinforcing fabric ply.

Bags can also be made according to this invention from a plurality of concentrically assembled individual tubular films of substantially the same flat width, such films being of the same or different polymers. Bags made of such multi-ply films generally offer such advantages as improved energy absorbing characteristics, and puncture and abrasion resistance over bags made from single ply film of the same thickness as the multi-ply film thickness.

It will be readily apparent to those skilled in the art that various changes and modifications may be made in the above description of the invention without departing from the nature or spirit thereof. Thus, for example, it is feasible, if desired, to substitute for the seamless tubular film from which the bag blank was die cut, tubing made by longitudinally edge sealing a flat sheet of thermoplastic film. Moreover, instead of heat-sealing the overlapped plies to form seals resistant to sheat to applied stress it is within the contemplation of the invention to use other methods of sealing as for example, adhesives, or solvent seals which are usually more expensive in time and material cost then the aforedescribed heat seals.

What is claimed is:

1. A thermosplastic film bag having a sealed rectangular-shape bottom closure formed by a pair of opposed infolded end flaps having inwardly tapered edges and a pair of opposed overlapping side flaps having inwardly tapered edges which are complementary to the tapered edges of said end flaps and which side flaps are substantially coextensive with the flattened bag width, said flaps being heat-sealed together by intersecting diagonal heat seals which seal the inwardly tapered end flaps to the inwardly tapered side flaps along their commonly overlapped length and by parallel heat seals which seal the opposed side flaps along their commonly overlapped length and which extend the length of the bag width and intersect said diagonal heat-seals, said parallel heat-seals being resistant in shear to applied stress.

2. A thermoplastic film bag having a heat-sealed rectangular-shape bottom closure formed by a pair of overlapping opposed side flaps having interiorly tapering edges and a pair of end flaps infolded underneath said overlapped side flaps, said end flaps having interior tapered edges complementary to said side flap edges, said side flaps and said end flaps heat-sealed directly to each other in the common areas of overlap of their respective inwardly tapered edges.

3. A bag formed from thermoplastic heat-sealable tubular film, said bag having a heat-sealed rectangular shape bottom closure formed by a pair of overlapping side flaps heat-sealed directly together along their overlapped length and a pair of end flaps inwardly folded underneath said side flaps and heat-sealed directly thereto, said side flaps each having a terminal edge running perpendicular to the bag length and being substantially coextensive in length to the flattened bag width and each having inwardly tapering side edges, said end flaps having interior edges of a taper complementary to said side flaps' side edges, said heat-sealed end and side flaps being resistant in shear to applied stress.

4. A thermoplastic bag according to claim 3 wherein the film is polyethylene film.

5. A thermoplastic film bag having a heat-sealed rectangular-shape bottom closure formed by a pair of infolded end flaps and a pair of overlapping side flaps substantially coextensive with the flattened bag's width, a heat-sealed top closure formed by a pair of infolded end flaps and a pair of infolded overlapping side flaps, said top closure forming flaps having interior terminal vertical edges spaced parallel to the bag's longitudinal flattened edges, a tubular filling valve of thermoplastic film integrally heat-sealed to said top closure, said valve having a filling opening on one end positioned substantially coextensive with the outer edge of one of the top closure's infolded end flaps and a discharge opening into the bag interior adjacent to the inner edge of the other infolded end flap, said valve comprising a rectangular sheet of thermoplastic film overlapped and heat-sealed in tubular form to both of said infolded side flaps and to one infolded end flap, said tubular valve walls being collapsible by pressure exerted thereon by the bag's contents to thereby close said openings.

6. A thermoplastic film bag of flattened tubular film, said bag having a heat-sealed bottom closure and a rectangular-shape top closure, said top closure being formed by a pair of infolded overlapping side flaps and a pair of infolded end flaps, said flaps each having interior terminal vertical edges spaced parallel to the longitudinal flattened edges of the bag, a tubular valve of thermoplastic film integrally heat-sealed to said top closure, said valve having a filling opening on one end positioned substantially coextensive with the outer edge of one of the top closure's infolded end flaps and a discharge opening into the bag interior adjacent to the inner edge of the other infolded end flap, said valve comprising a rectangular sheet of thermoplastic film overlapped and heat-sealed in tubular form to both said infolded side flaps and to one infolded end flap, said tubular valve walls being collapsible by pressure exerted thereon by the bag's contents to thereby close said openings.

7. A thermoplastic film bag of flattened tubular film, said bag having a heat-sealed bottom closure and a heat-sealed rectangular-shaped, valve containing top closure formed by a pair of infolded overlapping side flaps, each flap having one vertical side edge running parallel to and spaced from the bag's longitudinal flattened edges and one side edge spaced diagonally away from the immediately adjacent flattened edge, and by a pair of infolded end flaps, one of said end flaps having two opposite vertical side edges of the same length as the vertical edges of the side flaps, the other end flap having two opposite side edges corresponding to the diagonal side edges of the side flaps, a tubular filling valve of thermoplastic film integrally heat-sealed within said top closure, said valve having a filling opening on one end positioned substantially coextensive with the outer edge of the infolded end flap having vertical side walls and a discharge opening positioned interiorly in the bag and adjacent to the inner edge of the other infolded end flap, said valve comprising a rectangular sheet of thermoplastic film overlapped and heat-sealed in tubular form to both said infolded side flaps and to the infolded end flap having the vertical side edges and to the outer edges of said infolded side flaps, said tubular valve being collapsible by pressure exerted thereon by the bag's contents closing the valve opening and, simultaneously, preventing the valve from being blown out under the forces of pressure exerted on the valve by the bag contents during handling of the bag, said infolded and overlapped side flaps being heat-sealed to the infolded and commonly overlapped surfaces of each end flap, the heat-seals in said top closure being resistant in shear to stress applied thereto by the bag's contents.

References Cited by the Examiner
UNITED STATES PATENTS

| | | | |
|---|---|---|---|
| 221,712 | 11/1879 | Adams | 229—594 |
| 1,995,286 | 3/1935 | Arzet | 229—58 |
| 2,305,192 | 12/1942 | Poppe | 229—60 X |
| 2,353,605 | 7/1944 | Waters | 229—58 |
| 2,381,850 | 8/1945 | Williams | 93—35 |
| 2,771,010 | 11/1956 | Piazze | 93—35 |
| 3,004,698 | 10/1961 | Ashton | 229—62.5 |
| 3,124,297 | 3/1964 | Vergobbi | 229—48 |

FOREIGN PATENTS 401,579   5/1942   Italy.

JOSEPH R. LECLAIR, *Primary Examiner.*

GEORGE O. RALSTON, *Examiner.*